Dec. 8, 1925.
E. C. CLIFFORD
1,564,530
STORAGE BATTERY
Filed July 19, 1922
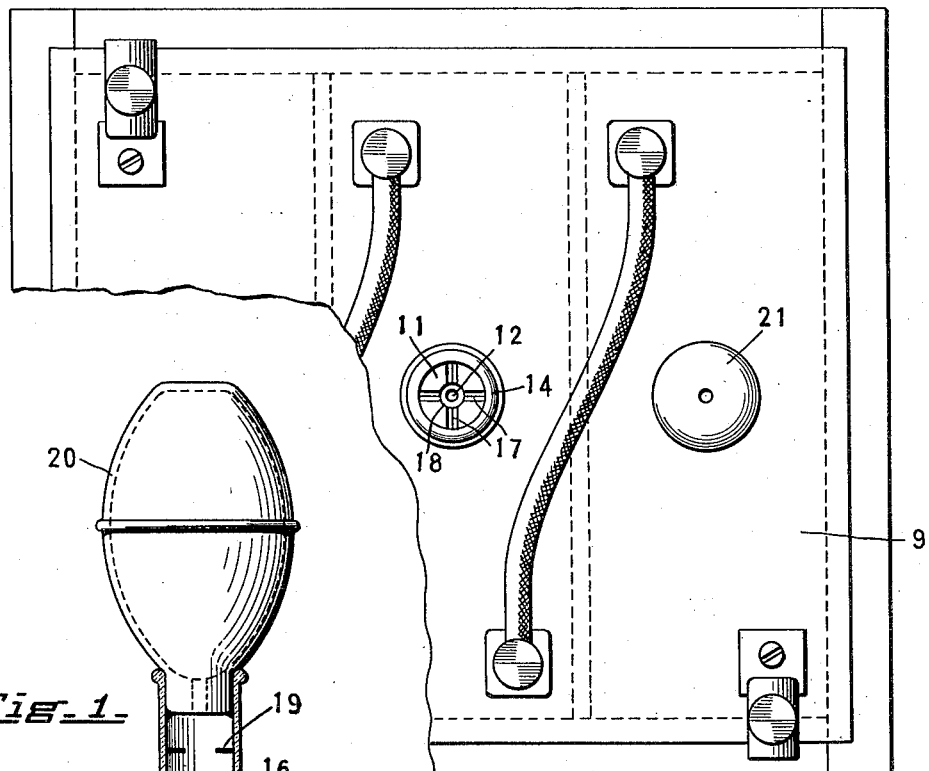
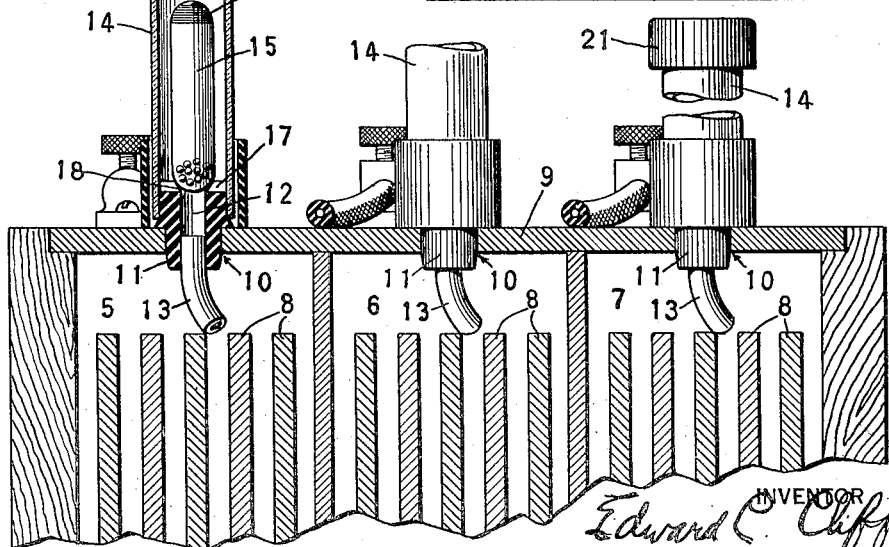
Edward C. Clifford INVENTOR
BY Frank J. Kent ATTORNEY Patented Dec. 8, 1925.

1,564,530

UNITED STATES PATENT OFFICE.

EDWARD C. CLIFFORD, OF NEW YORK, N. Y.

STORAGE BATTERY.

Application filed July 19, 1922. Serial No. 575,920.

*To all whom it may concern:*

Be it known that I, EDWARD C. CLIFFORD, a citizen of the United States, residing at New York, in the county of New York and State of New York, have invented certain new and useful Improvements in Storage Batteries, of which the following is a specification.

This invention relates to the care of storage batteries.

The present method of testing the batteries and replenishing the water by means of a hydrometer syringe is objectionable because of the spilling or dripping of the acid solution in transferring the syringe from one cell to another; the removal and replacement of the caps of the cells before and after using the hydrometer also is a nuisance, particularly when the caps have been splashed with acid. The method in vogue also makes no provision for indicating the height of the electrolyte in the different cells.

The objects of the invention are to overcome or avoid these various objections and this has been accomplished by making the hydrometer a part of the battery which it serves. To avoid unnecessary duplication a part or parts of the hydrometer may be made removable for engagement with co-operative parts on the different cells.

Various other novel features of the invention will appear as the specification proceeds.

In the drawing accompanying and forming part of this specification I have illustrated the invention embodied in only one of its practical commercial forms and therefore wish it understood that the structure may be modified in various respects without departure from the true spirit and scope of the invention as hereinafter defined and claimed.

Figure 1 is a broken vertical sectional view illustrating the application of one form of the invention to an ordinary storage battery.

Figure 2 is a broken plan view of the same.

The battery illustrated is of a type quite commonly used in radio work, having three cells 5, 6 and 7 containing plates 8 immersed in the electrolyte. These cells are sealed over at the top by a tight cover or covers 9, which ordinarily would have vent and filling openings closed by caps which have to be removed for testing or refilling purposes.

In the present disclosure each cell is provided with an opening 10 in the top thereof and in this opening there is engaged a tight-fitting plug 11 of rubber or the like designed to form a base for the hydrometer and having a passage 12 therethrough with which communicates the tube or nozzle 13 extending down to the electrolyte.

The hydrometer includes in each instance a cylinder or barrel 14 which usually is of glass and is shown as fitted down over the outside of the plug, containing a hydrometer float 15 weighted to stand up in the liquid and usually marked in some readily readable manner, as indicated at 16. This float, as indicated in the illustration, is designed to normally rest upon the upper end of the plug and form a venting closure for the cell. In the form illustrated, the vents are provided by means of cross grooves 17 in the top of the plug intercepting and extending below the seat 18 for the float so that at no time will the float ever completely close the passage.

The cylinder or barrel of the hydrometer may be suitably marked with a scale or indications such as shown at 19, which for the sake of simplicity might be a single mark which would indicate a charged condition when the float reached the same, with a definite quantity of solution in the barrel.

The battery solution is lifted in the test tube or barrel by suction producing means here shown as a simple hand bulb 20 having a neck detachably engageable in or on the upper end of the tube.

In the form of the invention disclosed each cell carries the barrel and float portions of a hydrometer which is in communication with the electrolyte in the cell and which is ready for action as soon as the hand bulb is applied thereto. Ordinarily, the cell is closed off by the float, which, however, vents the gases released particularly during battery charging operations. When the bulb is squeezed and then released, the cell containing a proper quantity of solution, a sufficient amount of electrolyte for test purposes will be withdrawn and the position of the float within the tube or barrel will indicate the condition of the cell. All liquid drains back automatically into the cell and one cell after another may be quickly tested by simply transferring the bulb from one cell tube to another. As the liquid will not ordinarily contact with the bulb, the same remains dry and clean and can be handled accordingly.

If the electrolyte within a cell is low this fact is made evident at once by the failure of the bulb to withdraw a sufficient quantity for a proper test. The desired amount of water or solution can then be supplied by simply pouring the same into the open upper end of the upstanding tube, the same then serving as a funnel and the venting of the combined float and valve permitting this liquid to drain down into the cell. The suction tubes thus operate as gages for testing the quantity of liquid in the cells, being preferably disposed with their lower ends close to the upper level of the plates where they will take out the amount desired for test purposes when the cell contains a proper quantity of electrolyte.

While the floats of the hydrometers will usually serve as sufficient closures for the battery cells, in dusty places or the like, caps such as I have shown at 21 may be applied to the hydrometer tubes when the bulb is not in use, said caps being suitably vented.

The invention it will be seen is particularly useful in radio work and the like where the battery may be placed in a more or less inaccessible location, making it hard to reach for testing and replenishing in the usual ways and where it is desirable to quickly test the individual cells quite frequently.

A special advantage of making the device as shown, that is, with the plug at the end of the syringe designed to fit into the opening in the cell and to thereupon form a support for the hydrometer, is that the invention can then be applied to any ordinary storage battery upon simply removing the usual cap and substituting the hydrometer in its place.

In making readings with the ordinary hydrometer, the hydrometer after being filled is lifted more or less to a level with the eyes, and in doing this, a quantity of the acid usually drips from the nozzle of the syringe with injurious results to clothing, floor coverings and the like. This is entirely overcome in the present invention, where the occasion for lifting or removing the hydrometer from the battery no longer exists. In addition to being particularly adapted for radio work, the invention is valuable for automobile batteries since each battery will then carry its own means for testing, enabling the operator to ascertain the condition of the battery without having to stop and look around for a testing instrument. In addition to the single marking for indicating the charged condition, it might be desirable to provide two other appropriately located marks to indicate the half charged and exhausted conditions of the battery.

What I claim is:

1. The combination with a storage battery cell having a hollow plug communicating with the interior thereof, of a hydrometer receptacle secured to said plug, said plug being provided with a tube communicating with the electrolyte within the battery.

2. The combination with a storage battery cell, of a hydrometer receptacle directly supported thereby and having a permanent connection with the electrolyte therein, said hydrometer receptacle having a removable part interchangeably engageable with cooperating ports on the different cells of a battery.

3. The combination with a storage battery cell having a hollow plug communicating with the interior thereof, of a hydrometer receptacle directly secured to said plug and having a permanent connection with the electrolyte therein by means of a suction tube extending into the cell a definite distance and operating as a liquid level gage.

4. The combination with a storage battery cell, of a hydrometer receptacle directly supported thereby and having a permanent connection with the electrolyte therein, said hydrometer receptacle having a float operating as a closure for the cell when the hydrometer is not in use.

5. The structure of claim 4 in which said combined float and valve has provision for venting the cell.

6. The structure of claim 1 in which the hydrometer receptacle includes a transparent tube marked for cooperation with a marked float within the same.

7. The structure of claim 1 in which the hydrometer receptacle includes a test tube permanently connected with the cell and a suction producing device readily detachable therefrom and adapted for engagement with the tubes of other cells.

8. The structure of claim 7 with a movable cap for closing the tube when the suction producing device is disconnected therefrom.

9. A hydrometer for permanent connection with a storage battery cell comprising a plug adapted to be secured and supported in an opening in the top of the cell and provided with a suction nozzle to extend down into the cell, a barrel carried by said plug and adapted to be supported thereby in upstanding position on top of the cell, a float within said barrel and adapted normally to rest upon the plug and substantially close the nozzle and a compression bulb supported on but readily removable from the barrel.

10. In combination with a storage battery cell having an opening in the top thereof, a hollow plug in said opening, of a hydrometer syringe fitted to engage and be held on said plug and provided with a nozzle projecting down into the electrolyte of the cell.

11. As an article of manufacture, a hydrometer attachment for storage battery cells comprising a hydrometer receptacle having a supporting base constructed to fit rigidly and operate as a closure to the venting and filling opening in the top of a storage battery cell and a nozzle dependent therefrom to enter the electrolyte to a definite desired depth.

In testimony whereof I affix my signature.

EDWARD C. CLIFFORD.